April 25, 1944.  J. S. LITTLE  2,347,421
APPARATUS FOR MOLDING
Filed Aug. 29, 1941  2 Sheets-Sheet 1

INVENTOR
J.S. LITTLE
BY
E.R. Nowlan
ATTORNEY

April 25, 1944.  J. S. LITTLE  2,347,421
APPARATUS FOR MOLDING
Filed Aug. 29, 1941  2 Sheets-Sheet 2

INVENTOR
J.S. LITTLE
BY
E.R. Nowlan
ATTORNEY

Patented Apr. 25, 1944

2,347,421

UNITED STATES PATENT OFFICE 2,347,421

APPARATUS FOR MOLDING

John S. Little, Westfield, N. J., assignor to Western Electric Company, Incorporated, New York, N. Y., a corporation of New York Application August 29, 1941, Serial No. 408,693

5 Claims. (Cl. 49—1)

This invention relates to apparatus for molding, and more particularly to apparatus for forming a bead of glass on a wire.

In the manufacture of various kinds of electrical devices, e. g. light bulbs, vacuum tubes and the like, it is often desired to pass a wire, rod or the like through a glass septum and to have a gas-tight seal of the glass to the metal. Sometimes this has been accomplished by softening a portion of the glass of the septum about the desired point, forcing the wire through the softened glass and melting the glass into close contact with the wire to seal the joint. Or the septum is pre-perforated, the wire passed through the perforation and the glass melted down around it. While such methods, in which the glass of the septum itself is melted down upon the bare metal to seal the joint, are generally satisfactory, they require sometimes time-consuming care and experienced skill to make a satisfactory joint, and may occasion difficulties if the septum itself be thin, yielding little material to work with. Hence methods have recently been developed in which a preformed pre-perforated bead of suitable glass is slipped on the wire and melted thereon to make a tight seal between the glass of the bead and the wire. It is then a matter of relatively little difficulty to seal the glass of the bead to the glass of the septum satisfactorily.

An object of the present invention is to provide an apparatus for molding a body of glass directly on a metallic wire and simultaneously creating a satisfactory gas-tight seal between the glass of the bead and the metal of the wire.

With the above and other objects in view, the invention may be embodied in an apparatus having means for supporting a length of wire, positioning and maintaining a predetermined quantity of powdered glass about a predetermined point of the wire, melting the measured charge of glass powder, pressing the melted charge to form the same and to seal it to the wire, and annealing and cooling the formed glass and wire.

Other objects and features of the invention will appear from the following detailed description of one embodiment thereof taken in connection with the accompanying drawings in which the same reference numerals are applied to identical parts in the several figures and in which Fig. 1 is a broken, partly diagrammatic view in side elevation of an apparatus for forming glass beads on wire in accordance with the invention;

Figure 1:
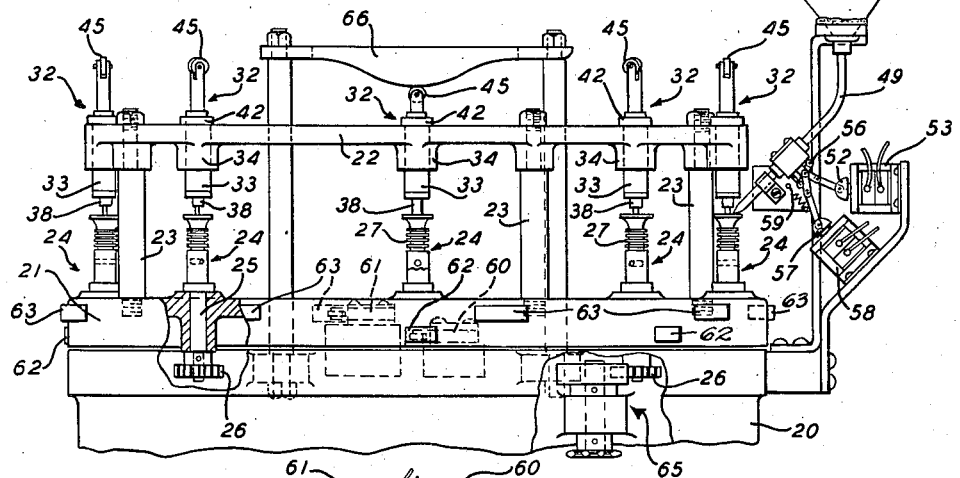
Figure 3:
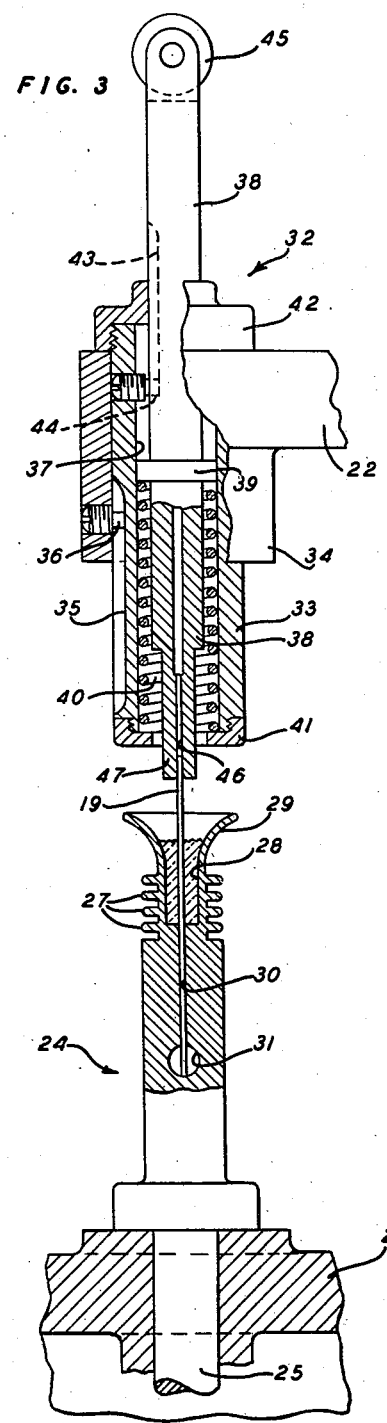
Fig. 3 is an enlarged detached view of one of the coacting pairs of molding devices.

As shown in Fig. 1, there is a stationary base 20 having a circular top, upon which is mounted a rotatable circular table 21. Spaced above the table parallel thereto and rigidly secured by pillars 23 is a disc-shaped support 22. A plurality of molds generally indicated at 24, one of which is shown in enlarged detail in the lower half of Fig. 3, is mounted at equidistant intervals in a circle near the periphery of the table 21. The bottom of each mold is an integral spindle 25 journalled in and extending down through the table and provided at its bottom end with a rigidly attached friction wheel or gear 26 (Fig. 1). The mold extends upwardly from the table in a generally cylindrical form. Near the upper end are integral heat transfer fins 27. In the upper end is a counterbored coaxial mold cavity 28 open at the top, and the mold wall is flared outwardly into an integral funnel 29. A small axial bore 30 to receive a wire and hold it with a predetermined length extending below the floor of the mold cavity, extends down into the body of the mold from the floor of the cavity and terminates in a transverse, larger sighting and cleaning bore 31.

Directly over and in coaxial alignment with each mold 24 is mounted in the support 22 a coactable ram unit, generally indicated at 32, one of which also is shown in enlarged detail in the upper half of Fig. 3. Such a unit comprises a cylindrical housing 33 vertically slidable in a corresponding bore in a sleeve 34 formed integrally with the support 22, and kept from rotation in the sleeve by a keyway 35 and key 36. A coaxial bore 37 extends through the housing vertically to receive and guide the generally cylindrical ram 38. The bore 37 is larger than the ram 38 and the latter is provided with a rigidly attached collar 39 to slide in bore 37 and also to act as upper abutment for a helical compression spring 40 surrounding the ram below the collar and abutted at its lower end against a cap 41 on the bottom end of the housing 33. The cap 41 is centrally perforated to allow the ram to pass freely. A second cap 42 is secured on the upper end of the housing and forms a stop shoulder normally supporting the housing on the member 22 in the position shown in Fig. 3, while the spring 40 supports the ram. The cap 42 is centrally perforated to have an easy sliding fit about the ram and thus provides a second guide means for the ram in addition to the collar 39. A keyway 43 in the ram and a key 44 in the housing prevent rotation of the ram in the housing. A cam roller 45 is mounted on a transverse axis in the upper extremity of the ram. An upwardly extending coaxial bore 46 opens from the bottom end surface of the ram. The bottom end 47 of the ram is formed and proportioned to fit properly into the mold cavity 28.

Figure 2:
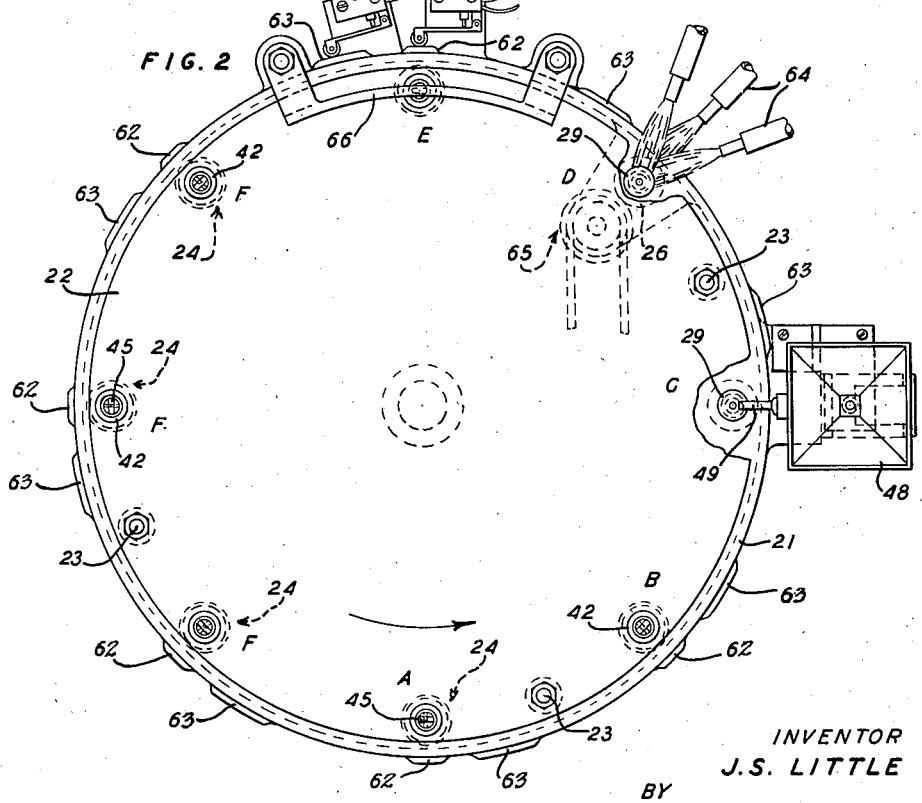
Fig. 2 is a plan view of the showing of Fig. 1.

Means (not shown) are provided to rotate the table 21 and support 22 step by step to provide for the successive operations of the procedure as hereinafter described. The details of construction and operation of such means are no part of the invention and so are here omitted. Indeed, so far as present purposes are concerned this may be thought of as being done by hand. In the present instance there are eight molds and ram units positioned at equal distances about the rim of the table as shown at A, B, C, D, E and F, F, F in Fig. 2. Hence the table is turned an eighth revolution at each step.

Figure 4:
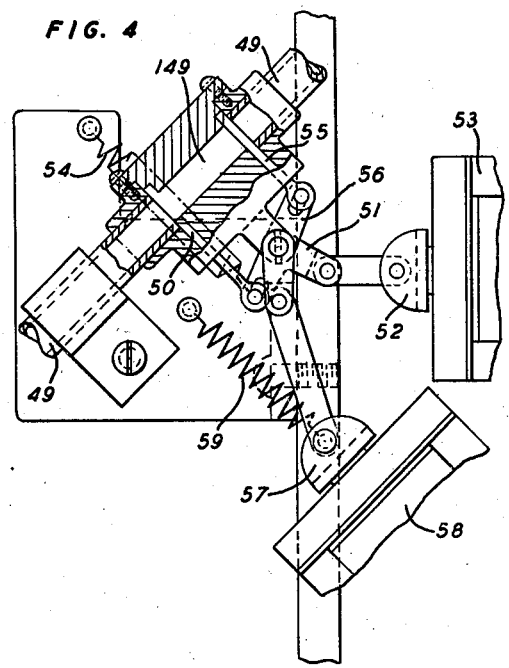
Fig. 4 is an enlarged detail view in side elevation of the charge measuring device.

At the position C, a glass powder measuring and supply unit is mounted on the base 20. This unit comprises a hopper 48 having a downwardly and radially inwardly extending delivery tube 49. Means to measure out a predetermined charge of glass powder and deliver it to a mold in position C are shown in detail in Fig. 4. A transversely slidable valve gate 50, shown open in Fig. 4, is secured at its outer end to one arm of a bell-crank lever 51 whose other arm is connected to plunger 52 of a solenoid 53. As shown the solenoid is energized and holding the gate 50, withdrawn from closing the tube 49, against the tension of the spring 54, which holds the gate in tube closing position when the solenoid is deenergized. A little above the gate 50 a second and similar gate 55, shown closed in Fig. 4, is held closed by a solenoid 58, core 57, and bell-crank lever 56 against a spring 59. The distance between the gates 50 and 55 is such that the length of tube 149 between the gates will just contain the desired amount of glass powder. The whole measuring device is shown as delivering or having just delivered such a measured charge. When the solenoids 53 and 58 are deenergized, the gate 50 closes and the gate 55 opens under the tension of the springs 54 and 59, whereupon the tube 149 is refilled with a charge of glass powder from the hopper 48. The solenoids 53 and 58 are controlled respectively by switches 60 and 61 suitably located to be actuated by cam members 62 and 63 respectively on the periphery of the table 21. It will be noted that the cam 62 begins to act after and ceases to act before the cam 63. Hence the sequence of actions in Fig. 4 is: (a) the gate 55 closes to cut off the measured charge in the tube 149 from the supply of glass powder above, (b) the gate 50 opens, allowing the measured charge to run down into a mold at station C, (c) the gate 50 closes, and (d) the gate 55 opens, allowing the tube 149 to be refilled in readiness for the next cycle when the next mold arrives at station C.

At station D, means, such as one or more blowpipes 64, are provided to heat the finned portion 27 of the mold about the cavity 28 until the glass powder therein is sufficiently melted. In order that the heating may be uniform, the gear or friction wheel 26 as it arrives at this station engages suitable driving means driven from a source of power (not shown) and generally indicated at 65. The wheel 26 being thus driven drives the spindle 25 and hence the finned portion 27 to rotate continuously while being heated by the means 64. As the mold leaves the station D the wheel 26 disengages from the drive 65 and the rotation of the mold ceases.

Above the station E is stationarily mounted a cam 66 which is engaged by and depresses the cam roller 45 of a ram unit 32 approaching the station E. Thus the ram 38 or, better, its tip 47, is forced down into the mold cavity 28 and forms the molten glass therein into shape as a bead closely engaging and in sealing contact with the wire 19.

In actual operation, an operator positioned before station A of the apparatus, lifts the housing 33 up in the sleeve 34 until the tip of the ram end 47 is clear of the top of a beaded wire. The wire and its bead are removed from the mold. A fresh length 19 of wire is inserted downwardly into the bore 30 of the mold until it bottoms in the bore 31. The sleeve 33 is lowered, the upper end of the wire 19 being meanwhile fed into the bore 46 of the ram. The table is stepped along, the freshly wired mold in the ram unit pausing at the idle station B. At the next step, the mold and ram unit stop at C, where a measured charge of glass powder is poured into the mold. At D, the glass powder is melted and at E it is molded. At the several stations F the mold cools by radiation, in the apparatus shown. The mass of the mold and the time period from D to A are so arranged that the cooling of the mold will be at a rate to permit the glass of the molded bead to be substantially self-annealed by the time it reaches A. If necessary, however, nozzles such as 64 and gear drives such as 65 may be provided at one or more of the stations F and fed with fuel to slow down the cooling or with compressed air to hasten it as required.

The embodiment of the invention above disclosed is illustrative and may be variously modified and departed from without departing from the spirit and scope of the invention as pointed out in and limited only by the appended claims.

What is claimed is:

1. An apparatus for forming beads of glass on wires, which comprises a rotatable member, a plurality of mold cavities positioned at regularly spaced intervals in the rotatable member near the periphery thereof, each mold cavity having a wire receiving bore coaxial therewith, a dispenser positioned adjacent to the rotatable member for charging a measured quantity of powdered glass into each of the cavities, means for actuating said dispenser at predetermined intervals, means adjacent to the rotatable member for causing a flame to impinge upon the molds as they are advanced therepast by the rotatable member to fuse the powdered glass within the mold cavities, a plurality of rams carried by the rotatable member, each having a wire receiving bore coaxially thereof and designed to be inserted into one of the mold cavities to compress the fused glass therein to cause it to adhere to a wire positioned in the coaxial bore in the mold, and means for successively actuating the rams as they are advanced therepast by the rotatable member.

2. In an apparatus for forming glass beads upon lengths of wire, a plurality of molds for retaining lengths of wire, a rotatable member upon which the molds are carried at points removed from the axis thereof, means for intermittently rotating the member, dispensing means having a discharge opening above the path of the molds for successively charging a measured quantity of powdered glass about wires positioned within the molds as the molds are advanced therepast, means mounted upon the rotatable member for actuating the charging means when a mold is positioned beneath the discharge opening, means adjacent to the rotatable member for successively melting the powdered glass charges within the molds, a plurality of rams each adapted to enter one of the molds and to compress the molten glass into a bead about the wire positioned therein, and fixed means for successively actuating the rams as they are advanced therepast.

3. In an apparatus for forming a body of glass upon a length of wire, a rotatable member, a cylindrical mold carried by the rotatable member at a point removed from the axis thereof and having a central bore for retaining a wire centrally thereof, means for rotating the rotatable member intermittently, dispensing means having a discharge opening above the path of the mold for feeding a measured quantity of powdered glass into the mold, means disposed upon the rotatable member for actuating the glass feeding means in synchronism with the movements of said member, means displaced from the dispensing means for melting the powdered glass within the mold, a reciprocable ram having a cylindrical shape designed to fit within the mold and so positioned as to enter the mold and to compress the molten glass therein into a bead about the wire, and means for actuating the ram after the mold has passed the glass melting means.

4. In an apparatus for forming beads of glass upon wires, a base, a circular plate rotatably mounted on the base, a plurality of molds mounted on the plate adjacent to the periphery thereof, a mold charger adapted when actuated to dispense a measured charge of powdered glass and having a spout so positioned as to discharge into the molds, means for actuating the charger, cam means positioned on the plate for operating the actuating means when a mold is positioned beneath the spout, a burner positioned adjacent to the periphery of the plate for causing a flame to impinge successively upon the molds to melt the glass within the molds, a plurality of rams carried by the plate in alignment with the molds for compressing the molten glass in the molds, and means to intermittently operate the rams.

5. In an apparatus for forming beads of glass upon wires, a plurality of open top molds, a rotatable, horizontally-disposed plate upon the outer portion of which the molds are mounted at spaced intervals for moving the molds in a predetermined path, a mold charger having a spout positioned over said path for intermittently supplying measured charges of powdered glass to the molds, means for operating the charger, means mounted on the plate for actuating the operating means when one of the molds is positioned beneath the spout, a blowpipe positioned adjacent to the path of the molds for successively heating the molds to melt the powdered glass therein, a plurality of rams mounted on the plate above and in alignment with the molds, resilient means urging the rams upwardly, and a stationary cam track positioned in the path of the rams of successively pressing the rams downwardly, whereby the rams enter the molds and compress the molten glass therein.

JOHN S. LITTLE.